(No Model.)

T. NEELY & A. MARLAND.
BARBED FENCE WIRE.

No. 251,273.

Patented Dec. 20, 1881.

WITNESSES:
Francis McArdle.
C Sedgwick

INVENTOR:
T. Neely
A. Marland
BY Munn & Co
ATTORNEYS.

N. PETERS. Photo-Lithographer. Washington, D. C.

UNITED STATES PATENT OFFICE.

THOMAS NEELY AND ALFRED MARLAND, OF PITTSBURG, PENNSYLVANIA.

BARBED FENCE-WIRE.

SPECIFICATION forming part of Letters Patent No. 251,273, dated December 20, 1881.

Application filed January 15, 1881. (No model.)

*To all whom it may concern:*

Be it known that we, THOMAS NEELY and ALFRED MARLAND, of Pittsburg, in the county of Allegheny and State of Pennsylvania, have invented a new and useful Improvement in Cattle-Guards for Fence-Wires, of which the following is a specification.

Figure 1:
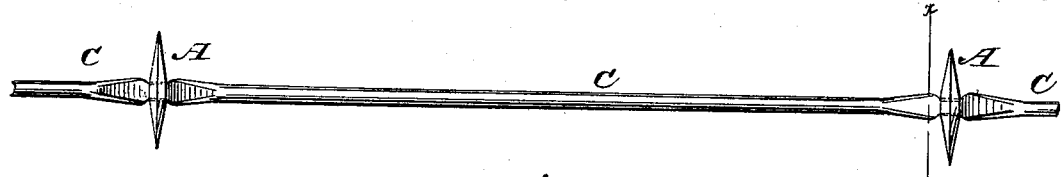
Figure 2:
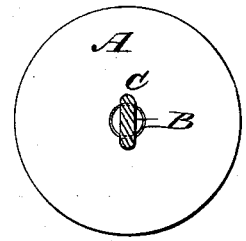
Figure 3:
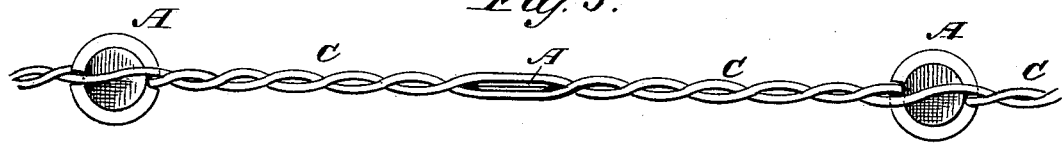
Figure 4:
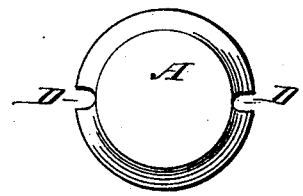

Figure 1 represents our improved guards attached to a single wire. Fig. 2 is a side elevation of a guard, the wire being shown in cross-section through the line $xx$, Fig. 1. Fig. 3 represents a modification of our improvement attached to twisted wires. Fig. 4 is a side elevation of the modified guard.

Similar letters of reference indicate corresponding parts.

The object of this invention is to furnish simple and effective guards for fence-wires so constructed as to prevent the skin and flesh of cattle from being torn and thus made sore, as they are liable to be when barbed guards are used.

The invention consists in combining, with one or more wires stretched and supported upon posts in the usual way, metal disks having smooth, sharp edges, which adapt them to make a clean cut in the skin of cattle coming in contact therewith.

When barbed guards are used upon fence-wires and cattle come in contact with the said guards, the skin and flesh of the cattle are torn, forming wounds slow to heal and liable to become inflamed and to fester. The barbs are also liable to break off in the flesh of cattle that run or are crowded or pushed against the fence, causing sores and rendering the meat unfit for food, all of which objections are obviated by our improvement.

Our improved guards A are formed of metal disks made with smooth, sharp edges, as shown in the drawings. We prefer to make the guards A of circular form.

The guards A can be placed upon single wires, as shown in Figs. 1 and 2, in which case they are made with a hole, B, through the center to receive the wire C, and are secured in place upon the said wire by flattening the wire with a suitable tool upon the opposite sides of the guards, as shown in Figs. 1 and 2, or by any other suitable means.

When the guards A are to be placed upon twisted wires C they have notches D formed in their opposite edges to receive the strands of the wires C, as shown in Figs. 3 and 4, so that the said guards will be held securely in place.

With this construction, should the cattle run against the fence or be crowded or pushed against it, the guards A will make a small, clean cut in their skins, which will readily heal, and the pain of which will cause the said cattle to keep out of contact with the fence.

What we claim is—

The combination, with the fence-wires, of the plates or disks provided with the knife-edges, for the purpose set forth.

THOMAS NEELY.
ALFRED MARLAND.

Witnesses:
FRANK W. SMITH,
GEO. H. WOODS.